(12) United States Patent
Kärkkäinen et al.

(10) Patent No.: US 9,787,770 B2
(45) Date of Patent: Oct. 10, 2017

(54) COMMUNICATION SYSTEM UTILIZING HTTP

(71) Applicant: GURULOGIC MICROSYSTEMS OY, Turku (FI)

(72) Inventors: Tuomas Mikael Kärkkäinen, Turku (FI); Valtteri Hakkarainen, Turku (FI); Ossi Kalevo, Akaa (FI)

(73) Assignee: GURULIGIC MICROSYSTEMS OY, Turku (FI)

( * ) Notice: Subject to any disclaimer, the term of this patent is extended or adjusted under 35 U.S.C. 154(b) by 0 days.

(21) Appl. No.: 14/684,955

(22) Filed: Apr. 13, 2015

(65) Prior Publication Data

US 2015/0222703 A1 Aug. 6, 2015

Related U.S. Application Data

(63) Continuation of application No. PCT/EP2014/001052, filed on Apr. 21, 2014.

(30) Foreign Application Priority Data

Apr. 23, 2013 (GB) .................................. 1307340.8

(51) Int. Cl.
*G06F 15/16* (2006.01)
*G06F 15/173* (2006.01)
(Continued)

(52) U.S. Cl.
CPC ...... *H04L 67/1095* (2013.01); *H04L 65/1069* (2013.01); *H04L 67/02* (2013.01); *H04L 67/06* (2013.01); *H04L 69/16* (2013.01)

(58) Field of Classification Search
CPC ......... H04L 67/02; H04L 67/06; H04L 67/42; H04L 67/1095; H04L 65/602;
(Continued)

(56) References Cited

U.S. PATENT DOCUMENTS 6,892,240 B1 5/2005 Nakajima
9,268,651 B1 * 2/2016 Salyers ............... G06F 11/1464
(Continued)

FOREIGN PATENT DOCUMENTS

FR 2 869 490 A1 10/2005
JP 2003-101518 A 4/2003
(Continued)

OTHER PUBLICATIONS

Japanese Office Action "Notification of Ground of Rejection" in English language in connection with Japanese Application No. 2016-508045, dated Mar. 28, 2016 (5 pages).

(Continued)

*Primary Examiner* — Farzana Huq
(74) *Attorney, Agent, or Firm* — Robert P. Michal, Esq.; Carter, DeLuca, Farrell & Schmidt, LLP (57) ABSTRACT

A communication system, method and a non-transitory computer-readable storage medium which is operable to support HTTP-based communication, wherein the communication system is operable to establish a two-way real-time communication link between two nodes of the communication system by employing a combination of GET and POST methods associated with HTTP, and wherein data exchange via the communication link is implemented in a chunked manner and/or as a series of multipart data blocks, wherein a maximum segment size (MSS) of data chunks and/or multipart data blocks communicated through the communication link is optimized as a function of a communication network capability supporting the communication link.

10 Claims, 3 Drawing Sheets

(51) Int. Cl.
*H04L 29/08* (2006.01)
*H04L 29/06* (2006.01)

(58) Field of Classification Search
CPC . H04L 65/607; H04L 65/608; H04L 65/1069; H04L 69/16; H04L 69/165
USPC ....... 709/203, 217, 219, 224, 228, 232, 236, 709/246, 247
See application file for complete search history.

(56) References Cited

U.S. PATENT DOCUMENTS

| | | | |
|---|---|---|---|
| 2002/0039196 A1* | 4/2002 | Chiarabini | G06F 3/1204 358/1.15 |
| 2002/0156901 A1* | 10/2002 | Erickson | H04L 29/06 709/227 |
| 2002/0184383 A1 | 12/2002 | Song | |
| 2004/0175047 A1 | 9/2004 | Gormish et al. | |
| 2005/0071485 A1* | 3/2005 | Ramagopal | H04L 63/0245 709/230 |
| 2005/0246442 A1* | 11/2005 | Gutjahr | H04L 63/02 709/227 |
| 2008/0298376 A1 | 12/2008 | Takeda et al. | |
| 2009/0089863 A1* | 4/2009 | Vanniarajan | H04L 63/0272 726/5 |
| 2009/0316677 A1* | 12/2009 | Kikuchi | H04L 1/0068 370/345 |
| 2010/0042677 A1 | 2/2010 | Ishikawa | |
| 2010/0238831 A1 | 9/2010 | Jeong et al. | |
| 2010/0260241 A1* | 10/2010 | Kim | H04L 1/0007 375/219 |
| 2011/0164574 A1* | 7/2011 | Rao | H04L 1/0007 370/329 |
| 2012/0303833 A1* | 11/2012 | Bao | H04N 21/233 709/231 |
| 2013/0286951 A1* | 10/2013 | Viswanathan | H04W 4/18 370/329 |

FOREIGN PATENT DOCUMENTS

| | | |
|---|---|---|
| JP | 2004-274760 A | 9/2004 |
| JP | 2008-252311 A | 10/2008 |
| KR | 1020090010416 A | 1/2009 |
| KR | 10-2010-0026697 A | 3/2010 |
| WO | WO-01/31887 A1 | 5/2001 |
| WO | WO 03/019390 A1 | 3/2003 |
| WO | WO-2007/121241 A2 | 10/2007 |

OTHER PUBLICATIONS

Korean Office Action in English language in connection with Korean Application No. 10-2015-7032976, dated Mar. 17, 2016 (6 pages).

"Transmission Control Protocol", Apr. 21, 2013 (Apr. 21, 2013), XP055134900, Retrieved from the Internet: URL:http://en.wikipedia.org/w/index.php?title=Transmission_Control_Protocol&oldid=551476932 [retrieved on Aug. 15, 2014] p. 7-p. 8 (17 pages).

"HTTP Tunnel," Apr. 20, 2013 (Apr. 20, 2013), XP055134895, Retrieved from the Internet: URL:http://en.wikipedia.org/w/index.php?title=HTTP_tunnel&oldid=551210672 [retrieved on Aug. 15, 2014] p. 2 (4 pages).

Notification of Transmittal of the International Preliminary Report on Patentability and International Preliminary Report on Patentability issued by the European Patent Office acting as the International Preliminary Examining Authority for International Application No. PCT/EP2014/001052 dated Jul. 23, 2015 (9 pages).

International Search Report issued by the European Patent Office acting as the International Search Authority for International Application No. PCT/EP2014/001052 dated Aug. 26, 2014 (5 pages).

PCT International Search Report dated Aug. 26, 2014 and issued in a related PCT International Application No. PCT/EP2014/001052 (5 pages).

PCT Written Opinion dated Aug. 26, 2014 and issued in a related PCT International Application No. PCT/EP2014/001052 (10 pages).

Combined Search and Examination Report under Sections 17 & 18(3) from UK Intellectual Property Office dated Oct. 30, 2013 and issued in a related British Patent Application No. GB1307340.8 (2 pages).

Examination Report under Section 18(3) from UK Intellectual Property Office dated Apr. 14, 2014 and issued in a related British Patent Application No. GB1307340.8 (2 pages).

Examination Report under Section 18(3) from UK Intellectual Property Office dated Feb. 9, 2015 and issued in a related British Patent Application No. GB1307340.8 (2 pages).

Wikipedia, "Transmission Control Protocol," Retrieved from the Internet: http://en.wikipedia.org/w/index.php?title=transmission_control_protocol&oldid=551476932, printed Mar. 26, 2015 (14pages).

Wikipedia, "HTTP tunnel," http://en.wikipedia.org/w/index.php?title=HTTP_tunnel&oldid=551210672, printed Mar. 26, 2015 (3 pages).

PCT Written Opinion of the International Preliminary Examining Authority, dated Apr. 1, 2015 and issued in a related PCT International Application No. PCT/EP2014/001052 (10 pages).

Communication (Communication pursuant to Article 94(3) EPC) dated Jul. 6, 2016 issued from the European Patent Office in relation to European Patent Application No. 14 721 760.8-1853 (8 pages).

Notice of Allowance of Patent issued by the Korean Intellectual Property Office for Korean Patent Application No. 10-2015-7032976 dated Jun. 30, 2016 with English translation (6 pages).

Anonymous: "Chunked transfer encoding—Wikipedia, the free encyclopedia", Apr. 9, 2013 (Apr. 9, 2013), XP055284281, Retrieved from the Internet: URL:https://en.wikipedia.org/w/index.php?title=Chunked_transfer_encoding&oldid=549469378 [retrieved on Jun. 28, 2016] 3 pages.

Communication entitled Intention to Grant under Section 18(4) issued by the United Kingdom Intellectual Property Office in relation to United Kingdom Application No. GB1307340.8 dated Jan. 26, 2017 (2 pages).

Anonymous: "Transmission Control Protocol", Apr. 21, 2013 (Apr. 21, 2013), XP055134900 (17 pages).

Communication (Communication Pursuant to Article 94(3) EPC) issued from the European Patent Office in relation to European Patent Application No. 14 721 760.8-1853 dated Feb. 10, 2017 (9 pages).

\* cited by examiner

COMMUNICATION SYSTEM UTILIZING HTTP

CROSS REFERENCE TO RELATED APPLICATIONS

This application is a continuation of PCT International Patent Application No. PCT/EP2014/001052 filed Apr. 21, 2014, which claims the benefit of UK Patent Application No. 1307340.8, filed on Apr. 23, 2013, the entire disclosure of each of which is incorporated herein by reference.

TECHNICAL FIELD

The present disclosure relates to communication systems, for example to communication systems which utilize Real-Time Hypertext Transfer Protocol (HTTP) for communicating various types of digital data, for example graphics data, image data, video data, audio data and similar data. Moreover, the present disclosure is also related to methods of operating the aforesaid communication systems for communicating various types of data. Furthermore, the present disclosure also relates to non-transitory computer-readable data storage media having computer program code stored thereon, which when executed by a data processing system causes the data processing system to operate a communication system for communicating various types of data.

BACKGROUND INFORMATION

In overview, Hypertext Transfer Protocol (HTTP) is widely used for implementing the contemporary Internet. The Protocol is an application protocol for distributed, collaborative hypermedia information systems. In implementation, HTTP is a multi-linear set of objects which are operable to build a network using logical links to define the network. The links are often referred to as being "hyperlinks" which define a network relationship between nodes.

HTTP is operable to function as a request-response protocol, for example in a client-serving model as implemented for the Internet. In the model, a web browser is optionally used to implement a client, and a software application executing upon a server may host a web site. In operation, a given client submits a HTTP request message to the server, which responds by providing resources such as HTML files and other content, or performs data processing functions on behalf of the client, or even returns a response message to the client. The aforesaid web browser is susceptible to being implemented in various ways, for example as a user agent, as a web crawler or any other software executable upon computing hardware that accesses, consumes or displays Internet-derived data content.

HTTP is designed to permit immediate network elements to enable communications between clients and servers. High-traffic web-sites of the Internet often employ web cache servers that are operable to deliver content on behalf of upstream servers to improve response times for data and/or service delivery. Moreover, HTTP proxy servers at private network boundaries are beneficially used to facilitate communication for clients without a globally routable Internet address, namely by relaying messages via external servers.

HTTP resources are identified and located on a given network by using Uniform Resource Identifiers (URI's), also referred to as Uniform Resource Locators (URL's). Moreover, URI's and hyperlinks are expressed in Hypertext Markup Language (HTML) that is capable of forming webs of mutually interlinked hypertext documents.

An HTTP session is implemented by way of a sequence of network request-response transactions. For example, an HTTP client initiates a request by establishing a Transmission Control Protocol (TCP) connection to a particular port on a server. An HTTP server listens for the client's request message and responds by sending back a status line, for example "HTTP/1.1 200 OK" together with an associated message. A body of this associated message is often the requested resource, although an error message may alternatively be returned.

HTTP defines methods, conveniently referred to as "verbs", for indicating a desired action to be performed in respect of an identified resource. The resource is, for example, a data file or an output from an executable object residing on one or more servers. Examples of HTTP methods, also known as HTTP "verbs", are provided in Table 1.

TABLE 1

HTTP methods (HTTP "verbs")

| "Verb" | Details |
|---|---|
| GET | Requests a representation of a specified resource, wherein requests using "GET" should only retrieve data |
| HEAD | Requests a response which is identical to that obtainable from GET, but devoid of any response body; "HEAD" is often employed for retrieving meta-data in an efficient manner |
| POST | Requests that a given server accepts an entity enclosed in the request as a new sub-ordinate of a given web resource identified by a URL |
| PUT | Requests that an enclosed entity be stored in respect of a supplied URI (URL). If the URI refers to an already existing resource, that resource is modified. |
| DELETE | Requests deletion of a specified resource |
| TRACE | Results in a received request to be echoed back to the given client |
| OPTIONS | Returns HTTP methods supported by a server associated with a given URL |
| CONNECT | Converts a requested connection to a transparent TCP/IP tunnel, for example for facilitating TLS and SSL-encrypted communication (HTTPs) through an unencrypted HTTP proxy as aforementioned; by default, an HTTP connection is unencrypted, whereas an HTTPS connection is encrypted. |
| PATCH | Requests application of partial modifications to a given resource |

Thus, a principal transfer protocol employed by contemporary web browsers is HTTP; several associated "ecosystems", and software that they utilize, in particular browser software applications, are not able to function without using HTTP. As stated, HTTP is based upon requests (see Table 1) that are transmitted and, on response to these requests, HTML pages or binary data such as images or audio streams/files are commonly served in response to receiving the requests.

On account of the complexity of the Internet, Internet communication delays, namely "latency", can arise in operation. Such delays can cause problems in demanding data exchange situations, for example when two-way (full-duplex) communication is desired, where real-time response is desired, for example transfer and reception of video images and/or audio with very little delay. Bi-directional communication via the Internet is known from Voice-over-Internet-Protocol (VoIP) and also from Internet-based video conferencing, for example, as contemporarily provided using Skype software. "Skype" is a registered trademark of Skype Limited Corporation of Dublin, Ireland.

It is known to employ protocols known as "WebSockets", as described at a web-site http://tools.ietf.org/html/rfc6455, for addressing specific types of communication needs. The following communication properties are thereby capable of being achieved:

(i) a WebSocket is employed inside an HTTP/HTTPS tunnel; in such a case, firewalls have already been opened for ports 80/443, because they are contemporarily commonly utilized on web browsers; and (ii) a WebSocket is utilized in a full-duplex connection mode, wherein only one TCP connection is able to communicate both ways in real-time, namely it is able to transmit and receive data with one connection by changing the direction of data delivery.

However, such WebSockets can be port-dependent which represents an undesirable limitation.

SUMMARY

The present disclosure seeks to provide a communication system which is capable of providing two-way data communication via an HTTP communication network in an improved manner.

Moreover, the present disclosure seeks to provide an improved method of operating a communication system for providing two-way data communication via an HTTP communication network.

According to a first aspect of the present invention, there is provided a communication system which is operable to support HTTP-based communication, wherein the communication system is operable to establish a two-way real-time communication link between two nodes of the communication system by employing a combination of GET and POST methods associated with HTTP, and wherein data exchange via the communication link is implemented in a chunked manner and/or as a series of multipart data blocks, wherein a maximum segment size (MSS) for data chunks and/or multipart data blocks communicated through the communication link is optimized as a function of a communication network capability supporting the communication link.

The communication system is advantageous in that it provides real-time two-way communication with reduced latency.

Optionally, the CONNECT method is capable of being used in three different types of scenarios:

(i) a connection is tunneled into a target; this is beneficially a default scenario;

(ii) a connection is tunneled via a local host to a target, resulting in data being transferred from a transmission process in the local service to a forwarding proxy process, from within the data is transmitted to the target; such an approach is beneficial because it is capable of preventing anti-virus software from analyzing the data and inadvertently blocking or otherwise interfering with the data;

(iii) a connection is tunneled into a forwarding proxy server which then redirects the data to its target; such an approach is beneficial to employ in load-balancing systems, namely in communication systems wherein a network load caused by clients is distributed optimally to the target. For example, it is faster to transmit data in a backbone network than via direct connection.

Optionally, in the communication system, the communication link includes a reception connection and a transmission connection for providing the two-way communication, wherein the connections are maintained open until an empty chunk and/or an empty multipart data block is received.

Optionally, in the communication system, the communication link is operable to employ encryption of data communicated therethrough.

Optionally, in the communication system, the communication link is operable to provide communication of at least one graphics data, image data, video data, audio data, and unstructured data.

According to a second aspect of the disclosure, there is provided a method of establishing a communication link via a communication system which is operable to support HTTP-based communication, wherein the method includes:

(a) using the communication system to establish a two-way real-time communication link between two nodes of the communication system by employing a combination of GET and POST methods associated with HTTP;

(b) exchanging data via the communication link in a chunked manner and/or as a series of multipart data blocks; and (c) optimizing a maximum segment size (MSS) for data chunks and/or multipart data blocks communicated through the communication link as a function of a communication network capability supporting the communication link.

Optionally, in the method, the communication link includes a reception connection and a transmission connection for providing the two-way communication, and the connections are maintained open until an empty chunk and/or an empty multipart data block is received.

Optionally, in the method, the communication link is operable to employ encryption of data communicated therethrough.

Optionally, in the method, the communication link is operable to provide communication of at least one of graphics data, image data, video data, audio data, and unstructured data.

According to a third aspect of the disclosure, there is provided non-transitory computer-readable storage medium for establishing a communication link via a communication system which is operable to support HTTP-based communication, including computer program code which when executed by a data processing system, causes the data-processing system to:

(a) use the communication system to establish a two-way real-time communication link between two nodes of the communication system by employing a combination of GET and POST methods associated with HTTP;

(b) exchange data via the communication link in a chunked manner and/or as a series of multipart data blocks; and (c) optimize a maximum segment size (MSS) for data chunks and/or multipart data blocks communicated through the communication link as a function of a communication network capability supporting the communication link.

Optionally, the computer program code is expressed in HTTP and is executable upon a server of a communication network operating according to HTTP.

The present invention is advantageous in that the communication system is capable of providing two-way, full-duplex communication, either unencrypted or encrypted, by utilizing known HTTP transfer protocol in such a way that extra configurations are not necessary in software or hardware firewalls and/or in anti-virus software applications executed by the communication system.

Moreover, the present invention is advantageous in that it improves the functionality and reliability of communication applications, and thus simplifies technical maintenance issues associated with the communication system, for example, data security settings.

It will be appreciated that features of the invention are susceptible to being combined in various ways without departing from the scope and spirit of the invention as defined by the appended claims.

BRIEF DESCRIPTION OF THE DRAWINGS

Embodiments of the present disclosure will now be described, by way of example only, with reference to the following drawings wherein.

In the accompanying drawings, an underlined number is employed to represent an item over which the underlined number is positioned or an item to which the underlined number is adjacent. A non-underlined number relates to an item identified by a line linking the non-underlined number to the item. When a number is not underlined and accompanied by an associated arrow, the non-underlined number is used to identify a general item at which the arrow is pointing.

DETAILED DESCRIPTION

Figure 1:
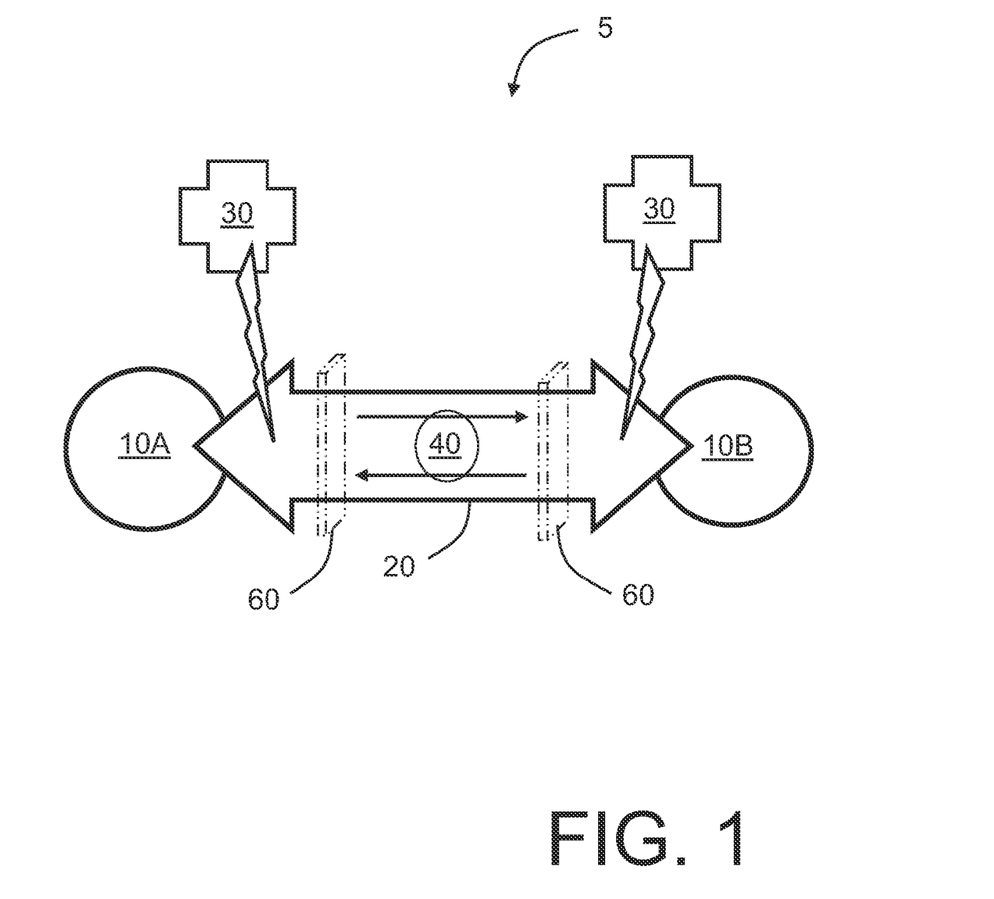
FIG. 1 is an illustration of a communication network operable to employ HTTP.

In overview, with reference to FIG. 1, there is hereinafter described a communication system, a portion of which is indicated generally by 5, and associated method, which is capable of deducing delays, namely "latency", in respect of HTTP for two-way real-time communication in a manner that description of HTTP employed conforms to standards such as RFC2621, RFC2068 and RFC1945. Normally, HTTP is not designed to enable real-time two-way communication between first and second nodes 10A, 10B, wherein a given client is able simultaneously to transmit real-time data and to receive real-time in such a manner that:

(i) a communication connection 20 employed between the two nodes 10A, 10B is operable to support the two-way communication in an encrypted format;

(ii) virus protection software 30 does not interfere with contents 40 being transmitted and received via the communication connection 20;

(iii) firewalls 60 are not able to prevent network traffic unless a general blockage of Internet traffic, namely "WWW traffic", is blocked, for example in a situation of a banking connection employed for secure financial transactions; and (iv) network devices, for example bridges and routers, are not able to analyze and interfere with data to be communicated via the communication connection 20.

Embodiments of the present disclosure are capable of addressing functionalities (i) to (iv) by employing the following features:

(a) two mutually different types of GET and POST methods are used, see Table 1 above, wherein the GET method constructs a reception connection via the communication connection 20, and the POST method constructs a transmission connection via the communication connection 20;

(b) both connections are tunneled using the CONNECT method as employed in contemporary HTTP; and (c) a form of "chunked" or multipart transfer encoding is employed, as will be elucidated in more detail below.

Conventionally, HTTP is used for Internet sessions, wherein the GET and POST methods are employed in a mutually independent manner. For example, the GET method is used for requesting HTML content from a webserver which is operable to function as a host for a webbrowser client, wherein connections for the GET method remain open until all response data is delivered from the host to the client. Moreover, a connection procedure is employed which is the same as the POST method, see Table 1, except that data is delivered from the client to the host.

It will be appreciated that the connection can be initialized both with the GET method and with the POST method. It is not relevant for the method pursuant to the disclosure which method is used to open the connection.

In embodiments described hereinafter, communication is executed in such a manner that a given socket is used in a half-duplex manner, which distinguishes the embodiments from known approaches, for example aforesaid WebSockets. In the embodiments, transmission and/or reception of data is more efficient than in a full-duplex connection, because network interface cards do not need to switch their input/output (I/O) states between reception and transmission. Such switching employed in known technical art consumes system resources and correspondingly decreases potential communication speed. The embodiments pursuant to this disclosure comply entirely with the HTTP standard, and do not try to lure the server to forcefully keep open, but instead comply fully with the definition of transfer encoding in the HTTP standard, thus yielding improved communication performance.

In the embodiments described hereinafter, a socket is utilized after an initialization of HTTP GET and POST methods only, either in a reception mode or in a transmission mode. In consequence, a network adapter used only needs to operate in a half-duplex state only, thereby saving network infrastructure and device resources, because the connection operates solely in either a transmitting mode or a reception mode after negotiated HTTP GET and/or POST method headers until a finish of the connection occurs. Moreover, other benefits also arise, for example firewalls and routers, namely hubs and switches, receive less switching load and thus will not break as fast as known contemporary full-duplex communication approaches that use only one full-duplex connection. Thus, embodiments described hereinafter are much more resource-efficient than aforesaid WebSockets, for example.

Aforementioned known WebSockets can easily be analyzed by firewalls as belonging to an unidentified connection type and thus be disconnected, thereby preventing or restricting their usage, irrespective of whether or not an associated connection is tunneled or not. In embodiments described hereinafter, a GET or POST connection functions according to the HTTP protocol, and thus firewalls cannot restrict or prevent communication utilizing these methods. For this purpose, the communication system pursuant to this disclosure optionally also utilize the tunneled connection.

In the embodiments as described hereinafter, UDP protocol which is estimated to be substantially three times faster than TCP, is beneficially employed. Optionally, the embodiments can use peer-to-peer (P2P) connections, which allow communication to be achieved at application level.

Embodiments described herein are differentiated from known HTTP implementations, in that known HTTP implementations are devoid of any link between GET and POST methods. In contrast, embodiments described herein employ GET and POST methods merged together in a novel manner for providing a real-time full-duplex data communication. The mentioned full-duplex data communication is implemented by using one reception connection and one transmission connection. One reception connection or one transmission connection can use one half-duplex connection mode or one full-duplex connection mode.

Although embodiments will be described herein based upon Transport Control Protocol (TCP), it will be appreciated that User Datagram Protocol (UDP) can be employed as an alternative. Although both the UDP and TCP rely on an underlying Internet Protocol (IP), and both a UDP datagram and a TCP segment are transmitted in an IP packet, the UDP is distinguished in that it is a connectionless protocol that makes it possible to achieve peer-to-peer communications between applications, not only inside a local area network (LAN), but also in the outer Internet, by using a network address translation (NAT) traversal technique. By employing such an approach, a need to transfer data via servers in the communication system 5 can be avoided, resulting in considerable communication network capacity being saved. An additional benefit resulting from using UDP in the communication system 5 is that it is substantially three times more efficient in its use of network communication capacity than TCP, because UDP is not a controlled protocol. Moreover, the MSS capacity measured in bytes in both IPv4 and IPv6 communication networks, for example used for implementing the communication system 5, is larger, because UDP headers are smaller than corresponding TCP headers.

Although use of TCP for both GET and POST connections will be described, it will be appreciated that, optionally, only one of these connections uses TCP and the other of these connections uses UDP. Moreover, it will also be appreciated that both the GET and POST connections can utilize UDP.

It will be further appreciated that the data in the transmitting or receiving end can also change from the circuit switched to IP-based data and correspondingly from IP-based to circuit switched data, without departing from the scope and spirit of the invention.

Figure 2:
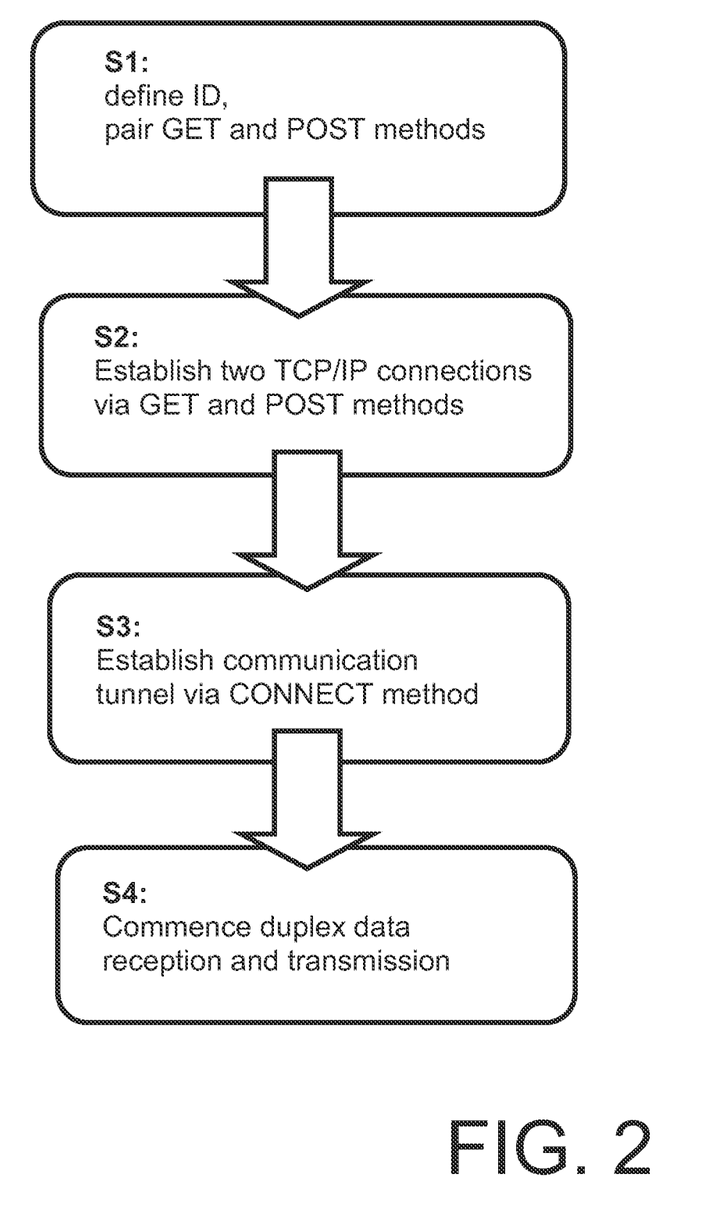
FIG. 2 is an illustration of a set of steps of a method of the disclosure.

In a first example embodiment, a series of steps are performed with reference to FIG. 2.

Step 1 (S1):

A client to a data connection generates a unique stream identification (ID), wherein the ID is employed to pair GET and POST methods together, so that a server employed to implement the data connection is aware that the pair of GET and POST methods belong to the same client. The ID employed will be elucidated in greater detail later. However, it will be appreciated that GET and POST methods do not limit the present invention when the unique stream identification (ID) is used to combine transmission and reception connections. The principal purpose of the Stream ID is to bind the transmission and reception connections of the client together at the server. This means that the server can then discard harmful, erroneous and/or unidentified connections before their processing continues. Such functionality makes it possible to protect the server and to reduce/prune the server load caused by unidentified connection requests and unnecessary computing. In other words, this enables the communication system to conserve resources, which provides a benefit of saving energy and decreasing the number of servers that are needed in the server facilities, especially in load balancing systems.

Step 2 (S2):

The client then establishes two TCP/IP connections to the server, for example at its default port "80", after which the client transmits a header associated with a CONNECT method. In operation, the CONNECT method converts the requested data connection into a transparent TCP/IP tunnel, for example usually to facilitate TLS and SSL-encrypted communication (HTTP) through an unencrypted proxy as aforementioned.

When implementing the STEPS 1 and 2, various forms of encryption are optionally employed, for example SSL 1.0, SSL 2.0, SSL 3.0, TLS 1.0, TLS 1.1, TLS 1.2 or similar types of encryption. However, the aforesaid tunnel is beneficially transparent for ensuring secure communication between different "ecosystems". Moreover, it is also beneficial to employ hardware which is protected against malicious attacks or interference. Such a transparent tunnel connection as employed for implementing embodiments of the disclosure is capable of preventing hacker, hostile software, anti-virus software, firewall software or other devices and/or software that are operable to monitor and analyze data traffic from interfering with data that is communicated via the tunnel connection.

Step 3 (S3):

Depending upon the receiving or transmitting connection employed for the communication tunnel, the header of the GET method or the POST method continues to be transmitted and received. The header contains necessary information for a given communication session provided by the communication tunnel. Moreover, the header beneficially employs a convention form of data structure, although the header includes the following parameters:

(i) the stream ID kind of information for bonded/linked connections; and (ii) the transfer encoding as chunked or multipart format.

Optionally, the header can contain information related to authentication of the sender and/or recipient. Alternatively, this information can be provided in the GET or POST URL.

Information included in the header ensures that transfer and reception of data occurs as individual data blocks. Beneficially, a Maximum Segment Size (MSS) of the data is optimized to a capability of a network supporting the communication tunnel, taking into consideration an amount of bytes used for the chunked or multipart header, so that bytes are not lost when transferring and receiving data. A reliable and secure data exchange is thereby provided.

Such network optimization is, for example, implemented by requesting a Maximum Transfer Unit (MTU) value from networks coupling connected client devices to the server. It is thereby feasible to identify a weakest communication link in the communication network, and thereafter setting the Maximum Segment Size (MSS) for transmissions to a client device associated with the weakest link at a rate which can be accommodated by the weakest link. The MSS value is optionally communicated by the server to other client devices of the system. Such network optimization is beneficially implemented using a method having following steps:

Step A: The communication system determines a weakest data link coupling the server to the client devices. For example, the MTU value for a given data link is 1500 Bytes. When this MTU value is subtracted by the number of TCP header Bytes, namely 40 Bytes, 1460 Bytes are available. These 1460 Bytes correspond to the MSS.

Step B: The communication system determines a MSS for a given session by employing the MSS of the weakest identified link.

Step C: Optionally, a Nagle algorithm employed in the communication system is disabled in order to prevent congestion control within the communication system, namely achieved by setting the TCP_NODELAY option on a socket of the communication system, which disables the Nagle algorithm. Such disablement of the Nagle algorithm is desirable, because the Nagle algorithm waits before a certain amount of Bytes of data have been added to a transmission queue before a corresponding data packet is sent. When the Nagle algorithm is disabled, the communication system is capable of sending a data packet of size determined solely by the communication system, as previously mentioned.

Step 4 (S4):

Once the HTTP request header has been transmitted, and a corresponding successful response has been received from the server, duplex data reception and transmission are then commenced. There has thereby been successfully made two connections with the server, namely a reception connection and a transmission connection. These connections are maintained in an open state until an empty data chunk or an empty multipart data block is received.

Two example embodiments will next be elucidated by way of HTTP code.

Example 1

There is provided HTTP code which is operable when executed to create a simple tunneled reception connection between the client and the server, wherein a peer with an IP address 192.168.0.101 connects to a host with an IP address 192.168.0.100. Use of both "GET" and "CONNECT" methods in the HTTP code is to be found, together with chunked transfer-coding being specified:

```
<connect>
<send> CONNECT 192.168.0.100:80 HTTP/1.0 \r\n
<send> Mozilla/5.0 (Windows NT 5.0) Gurulogic \r\n
<send> \r\n
<send> GET /readstream?
streamid=12345¶m1=value1&param2=value2 HTTP/1.1 \r\n
<send> Host: 192.168.0.100 \r\n
<send> Transfer-Coding: chunked \r\n
    <send> User-Agent : Mozilla/5.0 (Windows NT 5.0) Gurulogic \r\n
<send> \r\n
<recv> HTTP/1.1 200 OK \r\n
<recv> 5AD\r\n
<recv> 1453 bytes of data... \r\n
    <recv> 5AD\r\n
    <recv> 1453 bytes of data... \r\n
...
<recv> 5AD\r\n
<recv> 1453 bytes of data... \r\n
<recv> 0 \r\n
<disconnect from 192.168.0.100>
```

Next, a slightly modified example regarding the exemplary embodiment 1 is provided, where the HTTP tunneling has been omitted (i.e., no CONNECT is sent), namely 1b:

```
<connect>
<send> GET/
readstream?streamid=12345¶m1=value1&param2=value2
HTTP/1.1 \r\n
<send> Host: 192.168.0.100 \r\n
<send> Transfer-Coding: chunked \r\n
<send> User-Agent: Mozilla/5.0 (Windows NT 5.0) Gurulogic \r\n
<send> \r\n
<recv> HTTP/1.1 200 OK \r\n
<recv> 5AD\r\n
<recv> 1453 bytes of data... \r\n
<recv> 5AD\r\n
<recv> 1453 bytes of data... \r\n
```

```
...
<recv> 5AD \r\n
<recv> 1453 bytes of data... \r\n
<recv> 0 \r\n
<disconnect>
```

Example 2

There is provided HTTP code which is operable when executed to create a simple tunneled transmission connection between the client and the server, wherein a peer with an IP address 192.168.0.101 is connected with the host that has a corresponding IP address 192.168.0.100. Use of both "POST" and "CONNECT" methods in the HTTP code is to be found, together with chunked transfer-coding being specified:

```
<connect to 192.168.0.100>
<send> CONNECT 192.168.0.100:80 HTTP/1.0 \r\n
    <send> Mozilla/5.0 (Windows NT 5.0) Gurulogic \r\n
    <send> \r\n
    <send> POST
writestream?streamid=12345¶m1=value1&param2=value2
HTTP/1.1 \r\n
    <send> Host: 192.168.0.100 \r\n
    <send> Transfer-Coding: chunked \r\n
    <send> User-Agent : Mozilla/5.0 (Windows NT 5.0) Gurulogic \r\n
    <send> \r\n
    <send> 5AD\r\n
    <send> 1453 bytes of data... \r\n
    <send> 5AD\r\n
    <send> 1453 bytes of data... \r\n
    ...
    <send> 5AD\r\n
    <send> 1453 bytes of data... \r\n
    <send> 0 \r\n
    <recv> HTTP/1.1 200 OK \r\n
```

Now, a slightly modified example regarding the exemplary embodiment 2 is provided, where the HTTP tunneling has been omitted (i.e., no CONNECT is sent), namely 2b:

```
<connect>
<send> POST
/writestream?streamid=12345¶m1=value1&param2=value2
HTTP/1.1 \r\n
<send> Host: 192.168.0.100 \r\n
<send> Transfer-Coding: chunked \r\n
<send> User-Agent: Mozilla/5.0 (Windows NT 5.0) Gurulogic \r\n
<send> \r\n
<send> 5AD \r\n
<send> 1453 bytes of data... \r\n
<send> 5AD\r\n
<send> 1453 bytes of data... \r\n
...
<send> 5AD\r\n
<send> 1453 bytes of data... \r\n
<send> 0 \r\n
<recv> HTTP/1.1 200 OK \r\n
<disconnect>
```

Next, yet another modified example regarding the exemplary embodiment 2 is provided, where the HTTP tunneling has been omitted, and where "Content-Type: multipart" replaces "Transfer-Coding: chunked", namely 2c:

```
<connect>
<send> POST/
writestream?streamid=12345¶m1=value1&param2=value2
HTTP/1.1 \r\n
<send> Host: 192.168.0.100 \r\n
<send> Content-Type: multipart/x-mixed-replace;boundary=glms \r\n
<send> User-Agent: Mozilla/5.0 (Windows NT 5.0) Gurulogic \r\n
<send> \r\n
<send> --glms \r\n
<send> Content-Type: text/plain \r\n
<send> Content-Length: 1404 \r\n
<send> \r\n
<send> 1404 bytes of data... \r\n
<send> --glms \r\n
<send> Content-Type: text/plain \r\n
<send> Content-Length: 1404 \r\n
<send> \r\n
<send> 1404 bytes of data... \r\n
...
<send> --glms \r\n
<send> Content-Type: text/plain \r\n
<send> Content-Length: 1404 \r\n
<send> \r\n
<send> 1404 bytes of data... \r\n
<send> --glms-- \r\n
<recv> HTTP/1.1 200 OK \r\n
<disconnect>
```

Finally, one more modified example regarding the exemplary embodiment 2 is provided, where HTTP tunneling is used, and where "Content-Type: multipart" replaces "Transfer-Coding: chunked", namely 2d:

```
<connect>
<send> CONNECT 192.168.0.100:80 HTTP/1.0 \r\n
<send> Mozilla/5.0 (Windows NT 5.0) Gurulogic \r\n
<send> \r\n
<send> POST
/writestream?streamid=12345¶m1=value1&param2=value2
HTTP/1.1 \r\n
<send> Host: 192.168.0.100 \r\n
<send> Content-Type: multipart/x-mixed-replace;boundary=glms \r\n
<send> User-Agent: Mozilla/5.0 (Windows NT 5.0) Gurulogic \r\n
<send> \r\n
<send> --glms \r\n
<send> Content-Type: text/plain \r\n
<send> Content-Length: 1404 \r\n
<send> \r\n
<send> 1404 bytes of data... \r\n
<send> --glms \r\n
<send> Content-Type: text/plain \r\n
<send> Content-Length: 1404 \r\n
<send> \r\n
<send> 1404 bytes of data... \r\n
...
<send> --glms \r\n
<send> Content-Type: text/plain \r\n
<send> Content-Length: 1404 \r\n
<send> \r\n
<send> 1404 bytes of data... \r\n
<send> --glms-- \r\n
<recv> HTTP/1.1 200 OK \r\n
<disconnect>
```

In the above examples, it is assumed that the MSS is 1460 bytes, so actually the data size for an optimized chunk is 1453 bytes. An optimized chunk size is calculated in the communication system by using a formula as given in Equation 1 (Eq. 1):

$$MSS = (\text{beginning of chuck header}) - (\text{end of chunk header}) \quad \text{Eq. 1}$$

The beginning of the chunk header consists of the length of the actual chunk data, for example in hexadecimal notation, and of the end of one or more line characters, which are usually both Carriage Return (CR) and Line Feed (Lf). The end of the chunk is similar to the end of line characters, which complete the chunk.

Figure 3:
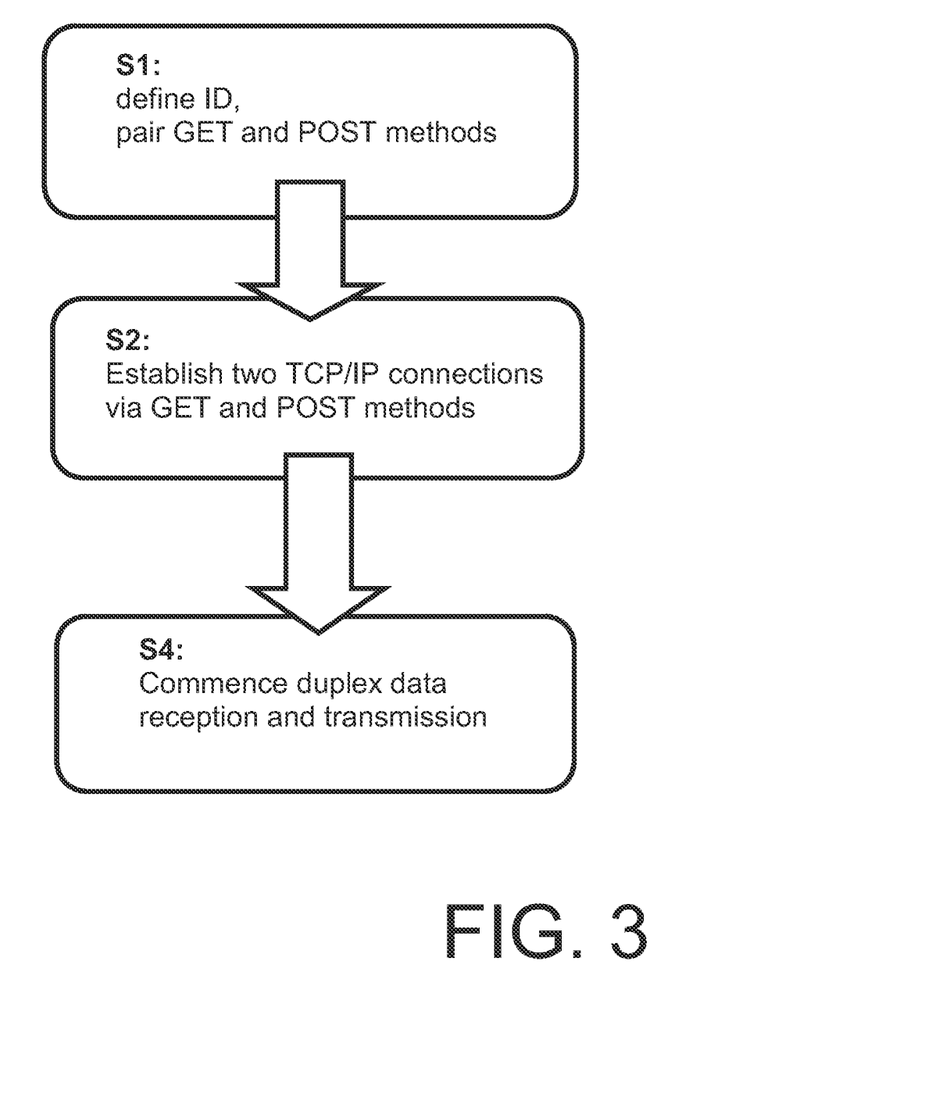
FIG. 3 is an illustration of an alternative set of steps of a method of the disclosure.

Referring next to FIG. 2, it will be appreciated that the STEP 3 (S3), namely establishing a connection tunnel by utilizing the CONNECT method, is optionally omitted as provided in FIG. 3. The connection tunnel is omitted when there is not a requirement for the tunnel. Thus, when a communication is not utilized, only STEPS 1, 2 and 4 are employed. Moreover, in respect of FIG. 2, it is also to be appreciated that the connection tunnel can be constructed only for the GET connection or the POST connection, namely an asymmetrical tunnel communication arrangement between a plurality of nodes. Optionally, the communication tunnel is used only for GET or POST connections.

Example 3

MSS optimization depends solely upon a given payload provided by a given data chunk, because corresponding http chunk headers have already been stripped off at that point in the processing, whereas the payload of the data block is 100%. Now, such MSS optimization is principally based upon a concept as follows: The maximum transmission unit (MTU) is an individual transmission burst and, as such, the largest protocol data unit that the layer can pass onwards, for example 1500 Bytes, and the MSS (maximum segment size) has a data size which is equal to MTU minus the protocol headers. In the embodiments of the technology pursuant to the present disclosure, the MSS carries exactly the amount of data in Bytes that the weakest link of the network in question can transmit. Therefore, no splitting of data into smaller packets occurs when technology pursuant to the application is used, which increases the speed and reliability of data transmission, which in turn results in less collisions and packet losses, for example in a WiFi network.

An example of MSS optimization is as follows:

| CLIENT 1 | OPERATORS between CLIENT1 and CLIENT 2 | CLIENT 2 |
|---|---|---|
| (MTU of the network 1500 Bytes) | (MTU of the weakest network 600 Bytes) | (MTU of the network 1300 Bytes) |

Commencing Connection Creation:

ICMP-pings are sent to test the network. It is detected that communication between the CLIENT 1 and the CLIENT 2 is prevented if MTU>600. Therefore, the MTU is set to 600 Bytes, which means that the MSS is 560 Bytes, after the 40 Bytes of TCP header have been omitted, namely taken into account. It will be appreciated that the headers in the UDP protocol are smaller, so if UDP is used, the payload will be correspondingly larger.

CLIENT1 then transmits to CLIENT 2 a 3000-Byte packet which is split into 6 parts. Such splitting is simple, and beneficially implemented pursuant to a following formula. The entire amount of Bytes is divided by the smallest MTU in the network, minus the start and end chunked headers, namely 3000/(560−(5+2))=5.42 packets, which is rounded to a nearest integer number of packets, unless other data is being queued for transmission.

Packet 1: 560 Bytes are transmitted, of which the payload is 553 Bytes.
Packet 2: 560 Bytes are transmitted, of which the payload is 553 Bytes.
Packet 3: 560 Bytes are transmitted, of which the payload is 553 Bytes.
Packet 4: 560 Bytes are transmitted, of which the payload is 553 Bytes.
Packet 5: 560 Bytes are transmitted, of which the payload is 553 Bytes.
Packet 6: 560 Bytes are transmitted, of which the payload is 235 Bytes.

If the packet were transmitted directly without splitting, namely as one 3000 Byte packet, then it would have been divided, namely fragmented, by devices of operators along the network, which would have taken time and which might potentially have caused problems, and possibly it would have been necessary to retransmit lost packets, all of which would have resulted in the transmitter having to wait before transmitting new packets, due to a lag caused by an unstable network of the recipient.

Modifications to embodiments described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

The invention claimed is:

1. A communication system for supporting HTTP-compliant communication comprising:
   a processor; and
   a memory coupled to the processor, the memory including instructions stored thereon which, when executed by the processor causes the communication system to:
   establish a two-way real-time communication link between two nodes of the communication system by employing a combination of GET and POST methods associated with HTTP;
   implement data exchange via the communication link in at least one of a chunked manner and as a series of multipart data blocks; and
   optimizing a maximum segment size (MSS) for at least one of data chunks and multipart data blocks communicated through the communication link according to a function of a communication network capability supporting the communication link, and the data exchange via the communication link is implemented, by employing transfer encoding, in the chunked manner and/or as the series of multipart data blocks,
   wherein the maximum segment size (MSS) is determined based on MSS of a weakest link in a communication network and consists of exactly an amount of data in bytes that the weakest link in the communication can transmit, and
   wherein the communication link comprises a two-way communication, and wherein the two-way communication is maintained open until at least one of an empty chunk and an empty multipart data block is received.

2. The communication system as claimed in claim 1, wherein the communication link is at least one of TCP/IP and UDP tunneled by employing a CONNECT method associated with HTTP.

3. The communication system as claimed in claim 1, wherein the communication link is operable to employ encryption of data communicated therethrough.

4. The communication system as claimed in claim 1, wherein the communication link is operable to provide communication of at least one of: graphics data, image data, video data, audio data, text data, and unstructured data.

5. A method of establishing a communication link via a communication system which is operable to support HTTP-based communication, wherein the method comprises:
   (a) establishing a two-way real-time communication link between two nodes of the system by employing a combination of GET and POST methods associated with HTTP;
   (b) exchanging data via the communication link in at least one of a chunked manner and as a series of multipart data blocks; and
   (c) optimizing a maximum segment size (MSS) for at least one of data chunks and multipart data blocks communicated through the communication link as a function of a communication network capability supporting the communication link;
   wherein the data exchange via the communication link is implemented, by employing transfer encoding, in the chunked manner and/or as the series of multipart data blocks,
   wherein the maximum segment size (MSS) is determined based on MSS of a weakest link in a communication network and consists of exactly an amount of data in bytes that the weakest link in the communication can transmit, and
   wherein the communication link comprises a two-way communication, and wherein the two-way communication is maintained open until at least one of an empty chunk and an empty multipart data block is received.

6. The method as claimed in claim 5, wherein the method further comprises at least one of TCP/IP and UDP tunneling the communication link by employing a CONNECT method associated with HTTP.

7. The method as claimed in claim 5, wherein the communication link is operable to employ encryption of data communicated therethrough.

8. The method as claimed in claim 5, wherein the communication link is operable to provide communication of at least one of: graphics data, image data, video data, audio data, text data, and unstructured data.

9. A non-transitory computer-readable storage medium storing a program that, when executed by a computer, causes the computer to implement a method for establishing a communication link via a communication system which is operable to support HTTP-based communication, the method comprising:
   (a) establishing a two-way real-time communication link between two nodes of the communication system by employing a combination of GET and POST methods associated with HTTP;
   (b) exchanging data via the communication link in at least one of a chunked manner and as a series of multipart data blocks; and
   (c) optimizing a maximum segment size (MSS) for at least one of data chunks and multipart data blocks communicated through the communication link as a function of a communication network capability supporting the communication link, wherein the data exchange via the communication link is implemented, by employing transfer encoding, in the chunked manner and/or as the series of multipart data blocks,
wherein the maximum segment size (MSS) is determined based on MSS of a weakest link in a communication network and consists of exactly an amount of data in bytes that the weakest link in the communication can transmit, and
wherein the communication link comprises a two-way communication, and wherein the two-way communication is maintained open until at least one of an empty chunk and an empty multipart data block is received.

10. The non-transitory computer-readable storage medium as claimed in claim 9, wherein the program is expressed in HTTP and is executable upon a server of a communication network operating according to HTTP.

* * * * *